United States Patent [19]
Hehl

[11] 4,113,414
[45] Sep. 12, 1978

[54] TAMPER-PROOF SAFETY COVER FOR INJECTION MOLDING MACHINES

[76] Inventor: Karl Hehl, Arthur-Hehl-Strasse 32, 7291 Lossburg 1, Fed. Rep. of Germany

[21] Appl. No.: 684,850

[22] Filed: May 10, 1976

[30] Foreign Application Priority Data

May 10, 1975 [DE] Fed. Rep. of Germany ....... 2520876
Jun. 28, 1975 [DE] Fed. Rep. of Germany ....... 2528907

[51] Int. Cl.² .......................... B29F 1/00; F16P 3/02
[52] U.S. Cl. ....................................... 425/152; 100/53
[58] Field of Search ............... 425/151, 152, DIG. 45, 425/153; 100/53

[56] References Cited
U.S. PATENT DOCUMENTS

| | | | |
|---|---|---|---|
| 3,020,593 | 2/1962 | Olmstead et al. | 425/152 |
| 3,386,133 | 6/1968 | Weiner | 425/DIG. 45 |
| 3,728,057 | 4/1973 | Grundmann | 425/151 X |
| 3,744,949 | 7/1973 | Hehl | 425/152 X |
| 3,877,858 | 4/1975 | Smith | 425/152 |
| 3,877,859 | 4/1975 | Grazine | 425/152 |

Primary Examiner—Francis S. Husar
Assistant Examiner—William R. Briggs
Attorney, Agent, or Firm—Joseph A. Geiger

[57] ABSTRACT

A tamper-proof safety cover for the die closing unit of an injection molding machine, where the cover carries a control rod of hardened steel attached to the cover wall with a lead-sealed bracket, the control rod operating a mechanical safety interlock as well as electrical disconnect switches and a hydraulic shut-off valve, when the safety cover is removed from its closed position. The electrical and hydraulic interlocks are housed in a lead-sealed interlock control unit which is at all times engaged by the control rod over an inaccessible guide plunger and cam follower.

13 Claims, 9 Drawing Figures

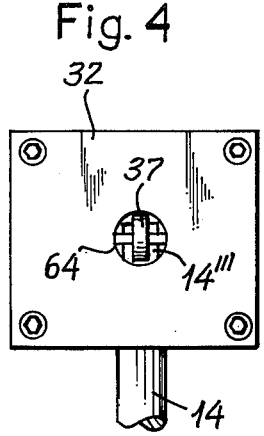
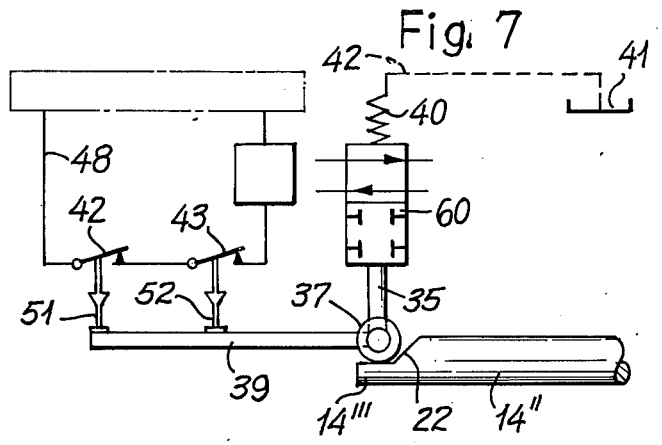
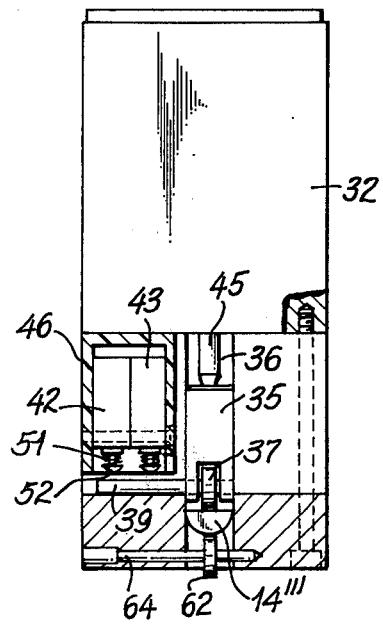
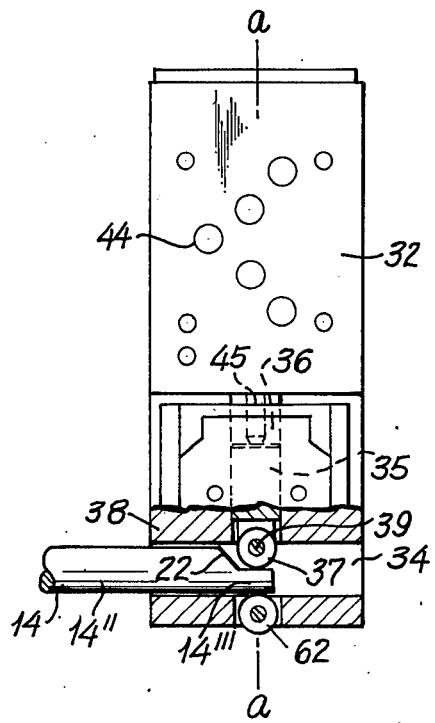

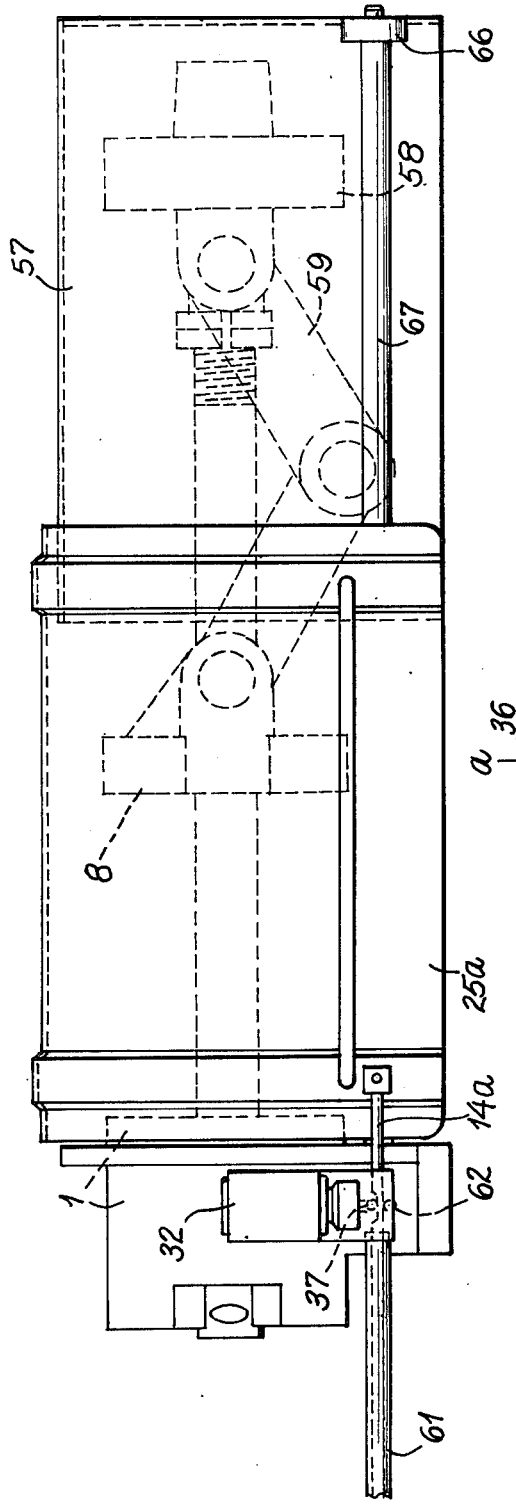
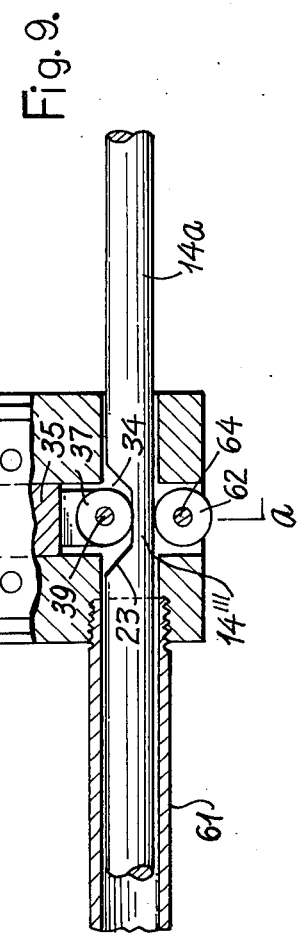
Fig. 8.
Fig. 9.

TAMPER-PROOF SAFETY COVER FOR INJECTION MOLDING MACHINES

BACKGROUND OF THE INVENTION

1. Field of the Invention

The present invention relates to die closing units of injection molding machines, and more particularly to safety covers for such die closing units which, when removed from their closed position, cause the electrical and/or hydraulic controls of the injection molding machine to be blocked, in order to make it impossible to operate the machine, except when the safety cover, or covers, are closed.

2. Description of the Prior Art

It is known to equip die closing units of injection molding machines with safety covers which have a longitudinal control rod attached to the safety cover so as to cooperate with an interlock tumbler which, when not retracted by the action of the cover control rod, prevents the closing of the injection molding die, by blocking the longitudinal movement of a push rod attached to the movable die carrier plate. Such an arrangement is disclosed, for example, in the German Offenlegungsschrift (Published Application) No. 1,529,779, where the push rod of the movable die carrier plate and the control rod of the safety cover thus provide a mechanical interlock action. This prior art device has the shortcoming that it is comparatively easy to render it inoperative, when, in violation of existing safety rules, a machine operator removes or readjusts one or more of the mechanical interlock elements.

More complex safety cover interlock devices feature means for interrupting and inactivating either the hydraulic control circuit, or the electrical controls, or both. However, experience has shown that, inspite of the posting of safety requirements and warnings, and inspite of the known risk of grave personal injury when adjustments are made while the machine is operating, some operators will attempt to inactivate these interlock devices, if the possibility to do so exists. The manufacturer of the machine is powerless to prevent such unauthorized interference.

In U.S. Pat. No. 3,804,003, for example, is disclosed a safety cover interlock device where the die closing unit features two longitudinally movable overlapping safety covers, the removal from the closed position of one of the safety covers causing a control rod to inactivate the hydraulic controls, while a second control member, operatively connected to the safety covers, automatically interrupts the main electrical circuit. This device is so designed that the microswitches which interrupt the main circuit are almost inaccessible to the operating personnel for unauthorized inactivation and tampering. A similar situation exists with respect to the control valve for the hydraulic circuit. No mechanical interlock is provided in this device.

SUMMARY OF THE INVENTION

It is a primary objective of the present invention to make an improvement over the prior art described above, by suggesting a tamper-proof safety cover for die closing units of injection molding machines, the cover being usable for units which are driven directly by a push-type cylinder and also for units which are driven by a knee linkage mechanism. A further objective is that the safety cover interlock mechanism should consist of only a few robust and wear resistant interlock elements which are so designed that it is no longer possible for an operator to interfere with them during operation of the injection molding machine in violation of existing safety procedures, without thereby leaving behind unequivocal proof of deliberate interference. Such proof is particularly important in connection with the question of possible warranty and liability claims against the manufacturer of the machine, in cases where important damage occurred, and/or personal injuries have been sustained.

In order to attain these objectives, the present invention suggests a tamper-proof safety cover for the die closing unit of an injection molding machine in which the safety cover carries attached thereto a non-detachable control rod which provides a mechanical interlock for the die closing unit by moving an interlock tumbler transversely in relation to a push rod extending from the movable die carrier plate, while the same or a second control rod reaches into a bore of a stationary interlock control unit, where the control rod operates shutoff members for the hydraulic circuit and for the electrical circuit of the die closing unit.

In a preferred embodiment of the invention, the non-detachable control rod is lead-sealed to the safety cover, removal of the control rod being possible only after the lead seal is broken. The destruction or removal of the lead seal will serve as positive proof that the safety cover has been deliberately tampered with. On the other hand, short of breaking the lead seal and removing the control rod, it would be necessary to inactivate three different interlock devices of the mechanical, hydraulic, and electrical type, in order to successfully operate the die closing unit while the safety cover is out of position. Such extensive manipulation and tampering, if performed by an operator, would readily be provable as deliberate and in clear violation of established safety and warranty obligations.

In the preferred embodiment of the invention, it is further suggested that the non-detachable control rod be of hardened steel, for a high wear resistance, and that this resistance be further enhanced by minimizing sliding friction, using anti-friction roller-type guide elements where the control rod has to exert transverse forces against spring loaded control elements of the interlock control devices. The hydraulic and electric interlock devices are preferably combined in a common lead-sealed interlock control unit.

The device of the invention further suggests that the interlock control unit be so designed that it is engageable by the control rod from both longitudinal directions, in order to give the control unit ready adaptability for use in connection with different types of die closing units, where either one or two safety covers, with one or two control rods, are employed.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIG. 4 shows an interlock control unit seen from below, in the direction of arrow A of FIG. 5;

FIG. 5 is a partially cross-sectioned elevational view of a complete interlock control unit;

FIG. 6 shows the interlock control unit of FIGS. 4 and 5 in a partially cross-sectioned side view;

FIG. 7 indicates schematically the interaction between the safety cover interlock control unit and the hydraulic and electrical circuits;

FIG. 8 is an elevational view of a different die closing unit, operated by means of a knee linkage mechanism, and featuring dual safety covers, as a second embodiment of the present invention; and FIG. 9 shows, by way of an enlarged partially cross-sectioned representation, the interlock control unit of FIGS. 4–6, as employed in conjunction with the embodiment of FIG. 8.

DESCRIPTION OF THE PREFERRED EMBODIMENTS

Figure 1:
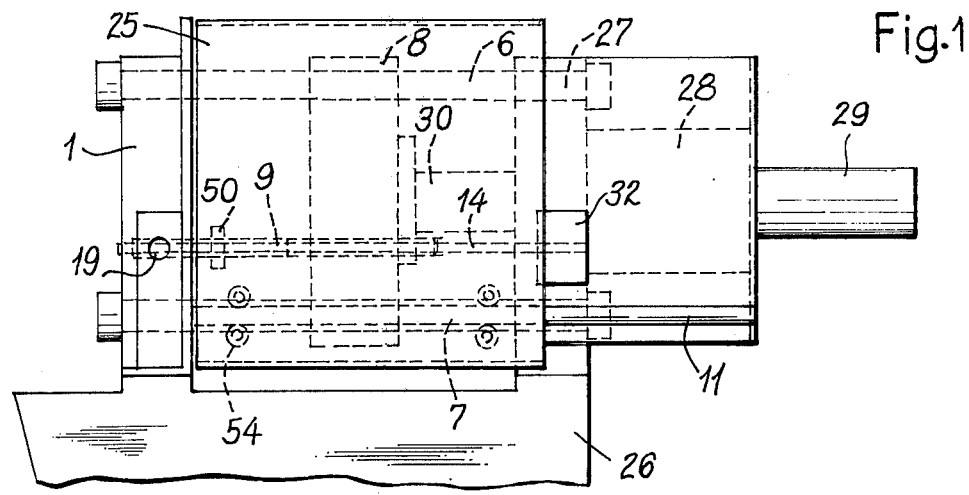
FIG. 1 is a schematic representation of a die closing unit operated by a push-type hydraulic cylinder assembly and featuring a tamper-proof safety cover embodying the present invention.

Referring to FIGS. 1 through 7, there is illustrated a first embodiment of the present invention, as part of a hydraulically operated die closing unit, using an in-line hydraulic cylinder unit of the push type. The die closing unit consists essentially of a stationary die carrier plate 1 and a likewise stationary head plate 27 which is rigidly connected to the former by means of two upper tie rods 6 and two lower tie rods 7. These stationary plates and tie rods thus form a rigid guide frame which, in turn, is supported on top of the machine base 6 of an injection molding machine.

The four tie rods 6, 7 support a movable die carrier plate 8 which is guided by the tie rods for opening and closing movements against the stationary die carrier plate 1. Between the stationary and movable die carrier plates is arranged an injection molding die 31, consisting of matching stationary and movable die halves. To the rear side of the movable die carrier plate 8 is connected a piston rod 30 which extends centrally through the head plate 27 from a hydraulic power cylinder 28. The latter is mounted on the rear side of the head plate 27. The power cylinder 28, by pushing the movable die carrier plate 8 against the stationary die carrier plate 1, creates the necessary die closing pressure for the injection molding operation.

To the rear of the power cylinder 28 is coaxially attached a smaller auxiliary cylinder 29 whose piston is integrally connected to the piston and piston rod 30 of the power cylinder 28. The piston of the power cylinder 28 may have valve-controlled internal flow bypass means so that a pressurization of the auxiliary cylinder 29 produces a rapid opening movement of the movable die carrier 8. A similar rapid closing movement is obtainable with the power cylinder 28 itself, as a result of differential piston rod diameters on the front and back sides of the main piston, when its bypass channels are open. Such a push-type cylinder assembly and die closing unit is disclosed in my co-pending U.S. patent application Ser. No. 610,280, filed Sept. 4, 1975.

The injection molding die 31 and the rearwardly adjoining space between the stationary die carrier plate 1 and the head plate 27 is covered by means of a safety cover 25, having the form of a generally U-shaped hood. The safety cover 25 is supported by a pair of longitudinal guide rods 11, the cover engaging the rods with longitudinally spaced pairs of guide rollers 54. In its closed position, shown in FIGS. 1 and 2, the safety cover 25 extends from the mounting face of the stationary die carrier plate 1 to about mid-width of the head plate 27, having an interior contour which allows for the safety cover to move over the head plate. The safety cover can thus be completely withdrawn from the space between the two stationary plates 1 and 27, into a position in which it surrounds the head plate 27 and the two cylinders 28 and 29.

Figure 2:
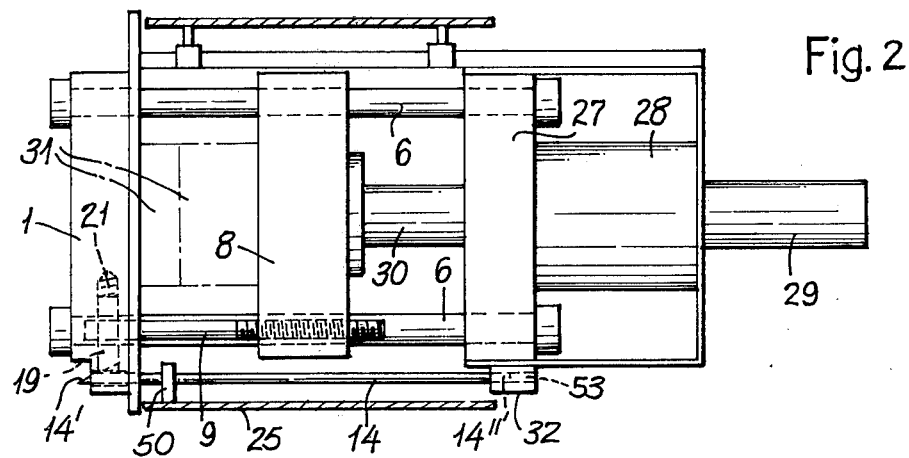
FIG. 2 is a plan view of the die closing unit of FIG. 1, the top portion of the safety cover being cut away.

On the inside of one of the two vertical side walls of the safety cover 25 is mounted a horizontal control rod 14 (see FIG. 2). Its attachment to the wall of the safety cover 25 is in the form of a single lead-sealed mounting bracket 50. This mounting bracket 50 is preferably located near the forward extremity of the safety cover 25, thereby providing a rigid support for the short forward extremity 14' of the control rod 14. As FIG. 3 indicates in greater detail, the forward extremity 14' of rod 14 bevelled and, for as long as the safety cover 25 is in its closed position, reaches into a longitudinal bore 56 of the stationary die carrier plate 1, preferably without touching the sides of said bore. The rear extremity 14" of the control rod 14 reaches into a bore 53 of an interlock control unit 32 which will be described in more detail further below.

In the stationary die carrier plate 1, at a short horizontal distance from the bore 56 accommodating the control rod 14, is arranged a second longitudinal bore 55 for a push rod 9 which is carried by the movable die carrier plate 8 in a threaded connection. Transversely to the two bores 55 and 56 extends a larger horizontal blind bore 24 inside which is arranged an interlock tumbler 19 and a compression spring 21, the tumbler 19 having a bore 20 which is held in alignment with the bore 55, when the control rod 14 is in place, and which is out of alignment in the absence of the latter, the tumbler 19 thereby blocking the movement of the push rod 9 and of the movable die carrier plate 8 into the closed die position. The interlock tumbler 19 is guided and limited in its displacement by a stop screw 18. The longitudinal position of the push rod 9 is adjustable in relation to the movable die carrier plate 8 by means of its earlier-mentioned threaded connection with that plate, the horizontal position of the rod 9 in the open die position being such that the far extremity of the push rod 9 is retracted from the transverse bore 24. This will allow the interlock tumbler 19 to advance into a push rod blocking position, when the safety cover 25 is opened.

The interaction between the rear extremity 14" of the control rod 14 and the interlock control unit 32 is shown in more detail in FIGS. 4–6. The control unit 32 is in the form of a block which is fixedly mounted to the side of the stationary head plate 27, its housing 38 being preferably lead-sealed shut. FIGS. 6 and 7 show the rear extremity 14" of the control rod 14 in a position which corresponds to the closed position of the safety cover 25.

As can be seen in FIG. 6, the rear extremity 14" of the control rod 14 includes a cam portion 14''' in the form of a lateral recess. The cam portion 14''' cooperates with a cam follower 37 which is carried by a transversely moving guide plunger 35 moving inside a guide bore 36 of the interlock control unit 32. The guide plunger 35 is operatively connected to a main shutoff valve 60 (FIG. 7) of the hydrulic circuit, closing the latter when the cam follower 37 is lifted, as a result of the safety cover 25 being opened and its control rod 14 being moved rearwardly. Simultaneously with the closing of the hydraulic main valve 60 are also actuated two electrical disconnect switches 42 and 43 (FIGS. 5 and 7), the switches 42 and 43 being controlled by a lateral arm 39 of the guide plunger 35 (FIG. 5). These switches, when depressed by the interaction between the lateral arm 39 and two spring-biased switch pushers 51 and 52, respectively, interrupt an electrical control circuit 48 of the injection molding machine.

In order to minimize friction and wear between the control rod 14 and the cooperating elements inside the interlock control unit 32, the rod 14 is supported by a counterroller 62, in opposition to the cam follower 37, so that the rod 14 does not bear against the bore 34. The counterroller 62 is mounted on a roller pin 64.

The control rod 14 is preferably a hardened steel rod and so attached to the side wall of the control cover 25 that no relative motion is possible between the cover 25 and the rod 14. Any possible relative displacement between these parts would have to be limited to such an extent that the interlock functions of the control rod 14 are in all cases positively performed. While the rear extremity of the control rod 14 is at all times guided vertically between the cam follower 37 and the counterroller 62, its forward extremity 14' is preferably not in contact with the bore 56, the mounting bracket 50 of the control rod 14 being arranged at a close distance from that extremity. A bevelled portion at the forward extremity 14' allows for the retracted control rod 14 to push the interlock tumbler 19 from its shifted locking position — when the safety cover 25 has been opened — back into its aligned position, shown in FIG. 3.

Simultaneously with this purely mechanical interlock, which prevents the die 31 from being closed once the safety cover 25 is removed, the control rod 14 also interrupts both the hydraulic and the electrical circuits, as explained further above, by moving rearwardly in relation in to the control unit 32, thereby lifting its guide plunger 35. The main shutoff valve 60 occupies the upper portion of the interlock control unit 32, having hydraulic connections at 44. The housing 38 contains the bores 34 and 36 for the control rod 14 and for the guide plunger 35, respectively, the switches 42 and 43 being additionally enclosed by a plastic housing 46 for their protection and for the prevention of access to them.

In FIG. 7 is shown schematically the interaction between the control rod 14, on the one hand, and the electrical circuit 48 and the hydraulic circuit 47 of the injection molding machine, on the other hand. In the latter, the tank is symbolically indicated at 41, while the main shutoff valve 60 is shown to be spring-biased downwardly by a compression spring 40.

In FIGS. 8 and 9 is shown a second embodiment of the invention, featuring a dual safety cover similar to the one disclosed in U.S. Pat. No. 3,804,003. The safety interlock devices themselves are very similar to those of the previously described embodiment which features a single safety cover. They differ in the following respects:

The stationary die carrier plate 1 and a thrust plate 58 of FIG. 8 are rigidly interconnected by means of two heavy horizontal tie rods 63 which support and guide the movable die carrier plate 8. In this case, however, the closing and opening movements are generated by means of a knee linkage mechanism 59 which is engaged by a generally vertically arranged hydraulic cylinder (not shown), whose piston rod would be connected to the knee joint of the knee linkage mechanism. Since this die closing unit takes considerably more space in the longitudinal sense than does the one previously described, it is preferable to use two separate safety covers, a main cover 25a reaching over the injection molding die and the movable die carrier plate 8, and an end cover 57 enclosing the knee linkage 59 and the thrust plate 58. Both covers are again generally U-shaped, but the end cover 57 has a smaller outline, so that the main cover 25a can be moved rearwardly over the end cover 57. Similarly, it is possible to remove only the end cover 57 by sliding it forwardly under the main cover 25a. Both covers are guided on a pair of longitudinal guide rods 67, the main cover engaging the guide rods by means of guide rollers (not shown) while the end cover 57 engages the same rods with guide bushings 66 (see also U.S. Pat. No. 3,804,003).

Figure 3:
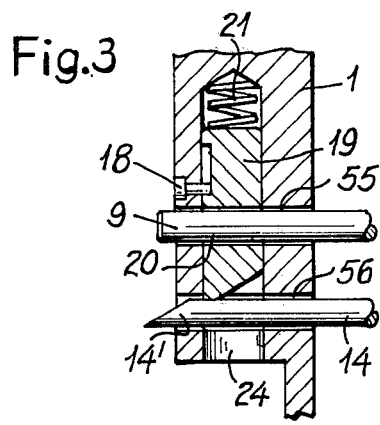
FIG. 3 shows an enlarged cross-sectional detail of FIG. 2.

The main cover 25a again carries on the inside of one of its side walls a control rod which operates a mechanical interlock device like the one which has been described further above in connection with FIG. 3. A push rod similar to push rod 9 is attached to the movable die carrier plate 8, both the control rod and the push rod being not shown in FIG. 8. On the outside of a side wall of the main cover 25a is arranged a second control rod 14a which, unlike the control rod 14 of the previous embodiment, extends forwardly into an interlock control unit 32 which is attached to the stationary die carrier plate 1.

As can be seen in the enlarged illustration of FIG. 9, the control rod 14a again reaches through a bore 34 of the interlock control unit 32, having a recessed cam portion 43' with which it cooperates with the cam follower 37 on the guide plunger 35. In this case, however, the control rod 14a, rather than advancing into the control unit 32 when the cover is removed from its closed position, is retracted therefrom, so that it becomes necessary to extend the control rod 14a beyond the control unit 32 by a distance which is equal to the maximum opening displacement of the main cover 25a. The control rod extension is preferably covered by a protective tube 61.

The cam portion 14''' of the control rod 14a is again provided with an inclined cam face 23, lifting the cam follower 37 when the main cover 25a is moved. Only when the cam portion 14''' is in alignment with the axis a—a of the interlock control unit 32, will the spring-biased main shutoff valve and the likewise spring-biased disconnect switches 42 and 43 of the control unit be allowed to close and to open, respectively. A counterroller 62 supported by a roller pin 64 again minimizes movement friction and wear on the control rod 14a.

The housing of the interlock control unit 32 is preferably secured against tampering and unauthorized intervention by one or several lead seals, as is the case with the interlock control unit 32 of the earlier-described embodiment.

It should be understood, of course, that the foregoing disclosure describes only preferred embodiments of the invention and that it is intended to cover all changes and modifications of these examples of the invention which fall within the scope of the appended claims.

I claim:

1. In an injection molding machine, a die closing unit comprising in combination:
   a stationary die carrier plate mounted on a base frame of the injection molding machine and carrying the stationary half of an injection molding die;

a movable die carrier plate facing the stationary die carrier plate and die half at a longitudinal distance therefrom and carrying the movable half of said die;

means associated with said die carrier plates for guiding the movable die carrier plate in the longitudinal direction, relative to the stationary die carrier plate;

hydraulic drive means connected to the movable die carrier plate, for the creation of opening and closing movements of the movable die carrier plate, said drive means including an electric power supply;

a hydraulic control system and an electrical control system, both being operatively connected to said drive means;

a safety cover enclosing the two die halves and at least the movable die carrier plate in all longitudinal positions against the access to the die;

means guiding the safety cover for a longitudinal opening movement;

safety interlock means operatively connected to the safety cover and to at least one of said control systems, for an automatic shutdown of said drive means, through the interruption and inactivation of said connected control system, or systems, when the safety cover is displaced from its closed position, the safety interlock means including a tamper resistant control member which is non-detachably affixed to the safety cover, and at least one cooperating control system interrupting member which is attached to a stationary part of the machine, said control system interrupting member being inaccessibly enclosed within a housing; and seal mens associated with said housing to prevent access to said control system interrupting member through said housing, without breaking the seal means.

2. A die closing unit as defined in claim 1, wherein the safety interlock means includes a shutoff valve which serves as a control system interrupting member;

the non-detachable control member of the safety interlock means cooperates with the shutoff valve in such a way that, when the safety cover is in its normal closed position, the shutoff valve is in its normal open state and, when the safety cover is removed from that position, its control member forcibly actuates the shutoff valve to block the hydraulic control system; and the shutoff valve is inaccessibly enclosed within said housing, and the cooperating control member is lead-sealed to the safety cover.

3. A die closing unit as defined in claim 1, wherein the safety interlock means includes a disconnect switch which serves as an electrical control system interrupting member;

the non-detachable control member of the safety interlock means cooperates with the disconnect switch in such a way that, when the safety cover is in its normal closed position, the disconnect switch is in its normal closed state and, when the safety cover is removed from that position, its control member forcibly actuates the disconnect switch to open said control circuit; and the disconnect switch is inaccessibly enclosed within said housing, and the cooperating control member is lead-sealed to the safety cover.

4. A die closing unit as defined in claim 1, wherein the control member of the safety interlock means is a longitudinally extending control rod which is fixedly and nondetachably mounted on a side wall of the safety cover;

the safety interlock means includes a shutoff valve which serves as a hydraulic system interrupting member, and at least one disconnect switch which serves as an electrical control system interrupting member;

both said members are inaccessibly enclosed within said housing, as part of an interlock control unit which is non-detachably mounted on a stationary part of the die closing unit, in alignment with said control rod, said housing having a longitudinal bore which is engaged by the control rod in all its longitudinal positions;

the interlock control unit further includes a guide plunger received inside a transverse bore of said housing, the guide plunger being spring-biased towards the control rod;

the control rod has a recessed cam portion so positioned that it cooperates with the guide plunger to allow the latter to advance against the control rod in the closed position of the safety cover, but pushing said plunger back, when the safety cover is removed from its closed position; and the guide plunger operatively engages both the electrical disconnect switch and the hydraulic shutoff valve, actuating both when pushed back by the longitudinally moving control rod.

5. A die closing unit as defined in claim 4, wherein the control rod is a hardened steel rod;

the recessed cam portion of the control rod includes an inclined cam rise;

the guide plunger includes a cam follower in engagement with said cam portion;

the control rod has a radial clearance to the surrounding housing bore; and the housing of the interlock control unit includes a counterroller supporting the control rod in opposition to the cam follower.

6. A die closing unit as defined in claim 4, wherein the die closing unit is of the so-called "push-type", further comprising, as part of said means for guiding the movable die carrier plate and of said hydraulic drive means:

a stationary head plate mounted longitudinally behind the movable die carrier plate;

at least two parallel longitudinally tie rods rigidly connecting the stationary die carrier plate to the head plate, while supporting and guiding the movable die carrier plate thereon; and a hydraulic cylinder assembly mounted on the rear side of the head plate and including a forwardly extending piston rod connected to the movable die carrier plate; and wherein the safety cover, when closed, reaches from the stationary die carrier plate to the head plate, having a generally U-shaped outline which is larger than that of the head plate so as to be able to move over the latter;

the interlock control unit is non-detachably mounted on the head plate; and the control rod is attached to the inside of a side wall of the safety cover, reaching rearwardly into said longitudinal bore of the control unit housing.

7. A die closing unit as defined in claim 6, wherein the control rod is a hardened steel rod, also reaching forwardly into an aligned bore of the stationary die carrier plate;

the safety interlock means further includes mechanical interlock means comprising: a push rod attached to the movable die carrier plate and reaching forwardly into a bore of the stationary die carrier plate, in parallel alignment with the control rod; and a spring-loaded transverely movable interlock tumbler carried by the stationary die carrier plate and cooperating with the control rod in such a way that it blocks the advance of the push rod and movable die carrier plate in the closing movement of the latter, when the safety cover is not in its closed position.

8. A die closing unit as defined in claim 6, wherein the control rod is a hardened steel rod which is non-detachably mounted on a side wall of the safety cover by means of a mounting bracket with lead-sealed fasteners; and the interlock control unit is non-detachably mounted on the head plate, using likewise lead-sealed fasteners.

9. A die closing unit as defined in claim 4, wherein the die closing unit is of the so-called "knee-linkage" type, further comprising, as part of said means for guiding the movable die carrier plate and of said hydraulic drive means:

a stationary thrust plate mounted longitudinally behind and spaced a distance from the movable die carrier plate;

at least two parallel tie rods rigidly connecting the stationary die carrier plate to the thrust plate, while supporting and guiding the movable die carrier plate thereon;

a knee linkage arranged between the movable die carrier plate and the thrust plate, having a transversely moving knee joint; and a hydraulic cylinder assembly with a piston rod connected to said knee joint; and wherein the safety cover is an assembly of two movable covers constituted by a main cover and an end cover, the main cover, when closed, reaching from the stationary die carrier plate to approximately midway between it and the thrust plate, while the end cover, when closed, covers the remaining length portion of the die closing unit;

the covers have generally U-shaped outlines, the end cover opening by moving under the closed main cover, and the main cover opening by moving over the closed end cover; said safety cover guide means including longitudinal guide rods supporting both covers;

the interlock control unit is non-detachably mounted on the stationary die carrier plate; and the control rod is attached to the outside of a side wall of the main cover, reaching forwardly into said longitudinal bore of the control unit housing.

10. A die closing unit as defined in claim 9, wherein the safety interlock means further includes a mechanical interlock means comprising:

a second control rod which is attached to the inside of a side wall of the main cover and reaches forwardly into an aligned bore of the stationary die carrier plate;

a push rod attached to the movable die carrier plate and likewise reaching forwardly into a bore of the stationary die carrier plate, in parallel alignment with the second control rod; and a spring-loaded transversely movable interlock tumbler carried by the stationary die carrier plate and cooperating with the second control rod in such a way that it blocks the advance of the push rod and movable die carrier plate in the closing movement of the latter, when the main cover is not in its closed position.

11. A die closing unit as defined in claim 10, wherein both control rods are hardened steel rods, being attached to a side wall of the main cover by means of lead-sealed fasteners; and the interlock control unit is non-detachably mounted on the stationary die carrier plate, using likewise lead-sealed fasteners.

12. A die closing unit as defined in claim 1, wherein the safety interlock means includes mechanical interlock means controlled by said control member, said mechanical interlock means including:

a transversely movable interlock tumbler received inside a transverse bore of the stationary die carrier plate so as to be movable between an advanced position and a normal position;

a longitudinal bore intersecting said transverse bore in the stationary die carrier plate;

a cross bore in the interlock tumbler in alignment with said longitudinal bore, when the tumbler is in its normal position;

a longitudinal push rod attached to the movable die carrier plate in alignment with the longitudinal bore in the stationary die carrier plate, said push rod reaching into the longitudinal bore and moving through the tumbler cross bore, when the movable die carrier plate advances into the closed die position; and tumbler positioning means defined by the control member and by the interlock tumbler for holding the tumbler in its normal position when the safety cover is closed, and for shifting it to the advanced position, in which the tumbler blocks the closing movement of the push rod and movable die carrier plate, when the safety cover is not in the closed position.

13. A die closing unit as defined in claim 12, wherein the control member of the safety interlock means is a longitudinally extending control rod which is fixedly and non-detachably mounted on a side wall of the safety cover; and the tumbler positioning means includes:

a second longitudinal bore in the stationary die carrier plate intersecting said transverse bore in alignment with the control rod, the control rod reaching into said bore, past the transverse bore, when the safety cover is in its closed position, but freeing the transverse bore when the cover is not closed;

a spring biasing the interlock tumbler towards its advanced position, the tumbler being held in its normal position through abutment against the control rod, when the safety cover is in its closed position; and cooperating cam portions on the interlock tumbler and on the control rod by means of which the control rod, after allowing the tumbler to move to its advanced position when the safety cover has been opened, pushes the tumbler back to its normal position when the safety cover is closed.

* * * * *